United States Patent
Jeran

(10) Patent No.: US 10,036,979 B2
(45) Date of Patent: Jul. 31, 2018

(54) COMMUNICATING A CLASSIFICATION OF A CONSUMABLE PRODUCT

(71) Applicant: HEWLETT-PACKARD DEVELOPMENT COMPANY, L.P., Houston, TX (US)

(72) Inventor: Paul L. Jeran, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/643,054

(22) Filed: Jul. 6, 2017

(65) Prior Publication Data

US 2017/0299981 A1     Oct. 19, 2017

Related U.S. Application Data

(63) Continuation of application No. 15/416,492, filed on Jan. 26, 2017, which is a continuation of application No. 14/787,204, filed as application No. PCT/US2013/052854 on Jul. 31, 2013.

(51) Int. Cl.
G06K 15/00 (2006.01)
G03G 15/08 (2006.01)

(52) U.S. Cl.
CPC .................................. *G03G 15/0863* (2013.01)

(58) Field of Classification Search
None
See application file for complete search history.

(56) References Cited

U.S. PATENT DOCUMENTS

| | | |
|---|---|---|
| 6,111,953 A | 8/2000 | Walker et al. |
| 6,158,837 A | 12/2000 | Hilton et al. |
| 6,260,029 B1 | 7/2001 | Critelli |
| 6,314,521 B1 | 11/2001 | Debry |
| 6,738,903 B1 | 5/2004 | Haines |
| 6,802,002 B1 | 10/2004 | Corella |
| 7,221,473 B2 | 5/2007 | Jeran |
| 7,284,277 B2 | 10/2007 | Lewis |
| 7,430,378 B2 | 9/2008 | Inami |
| 7,624,268 B2 | 11/2009 | Takada et al. |
| 7,755,782 B2 | 7/2010 | Simpson |
| 8,161,199 B1 | 4/2012 | Weiser |
| 2003/0025939 A1* | 2/2003 | Jeran ............... G06K 15/00 358/1.16 |
| 2003/0059050 A1* | 3/2003 | Hohberger ......... B41J 17/36 380/270 |
| 2004/0066435 A1 | 4/2004 | Lester |
| 2005/0008376 A1 | 1/2005 | Parry |
| 2005/0024416 A1 | 2/2005 | Dentel et al. |

(Continued)

FOREIGN PATENT DOCUMENTS

| | | |
|---|---|---|
| CN | 103098069 | 5/2013 |
| EP | 0903237 | 3/1999 |

(Continued)

OTHER PUBLICATIONS

Samsung Electronics Co., Ltd.; "Samsung Multifunction Printer Security"; Mar. 28, 2011; http://www.samsung.com/us/it_solutions/business/_pdf/Multifunction%20Printer%20Security.pdf.

*Primary Examiner* — Dung D Tran
(74) *Attorney, Agent, or Firm* — Fabian VanCott

(57) ABSTRACT

A non-volatile memory includes a mechanism that communicates a classification of the consumable product to a device.

18 Claims, 5 Drawing Sheets

(56) References Cited

U.S. PATENT DOCUMENTS

| | | |
|---|---|---|
| 2005/0285899 A1 | 12/2005 | Simpson |
| 2006/0198918 A1 | 9/2006 | Ishihara et al. |
| 2006/0204250 A1 | 9/2006 | Ishihara et al. |
| 2007/0198832 A1 | 8/2007 | Novack et al. |
| 2010/0278544 A1 | 11/2010 | Pfeuffer |
| 2011/0154043 A1 | 6/2011 | Lim et al. |
| 2012/0027423 A1 | 2/2012 | Kawai |
| 2012/0134687 A1* | 5/2012 | Jones ................ G03G 15/0863 399/12 |
| 2013/0169992 A1* | 7/2013 | Panshin ............... G06F 21/572 358/1.14 |

FOREIGN PATENT DOCUMENTS

| | | |
|---|---|---|
| GB | 2354735 | 4/2001 |
| RU | 2446056 C2 | 3/2012 |

* cited by examiner

COMMUNICATING A CLASSIFICATION OF A CONSUMABLE PRODUCT

BACKGROUND

Authentication is a process of proving or verifying that information is genuine. Authentication processes can use different mechanisms to ensure that the information is genuine. In one example, a consumable product includes a memory, and the memory includes a consumable product identifier. A host device that receives the consumable product can identify the consumable product by reading the identifier stored on the memory.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Digital signatures can be used as part of an authentication protocol by storing an identifier in the digital signature. An authenticating engine can request the identifier to determine whether the identifier matches what authenticating engine expects the identifier to be. If the identifier matches, the authentication engine may further inquire to whether the consumable product has a classification field or other mechanism to indicate whether the consumable product is authentic. The host device will respond to the consumable product differently depending on the classification of the consumable product.

In the following description, for purposes of explanation, numerous specific details are set forth in order to provide a thorough understanding of the present systems and methods. Reference in the specification to "an example" or similar language means that a particular feature, structure, or characteristic described is included in at least that one example, but not necessarily in other examples.

Figure 1A:
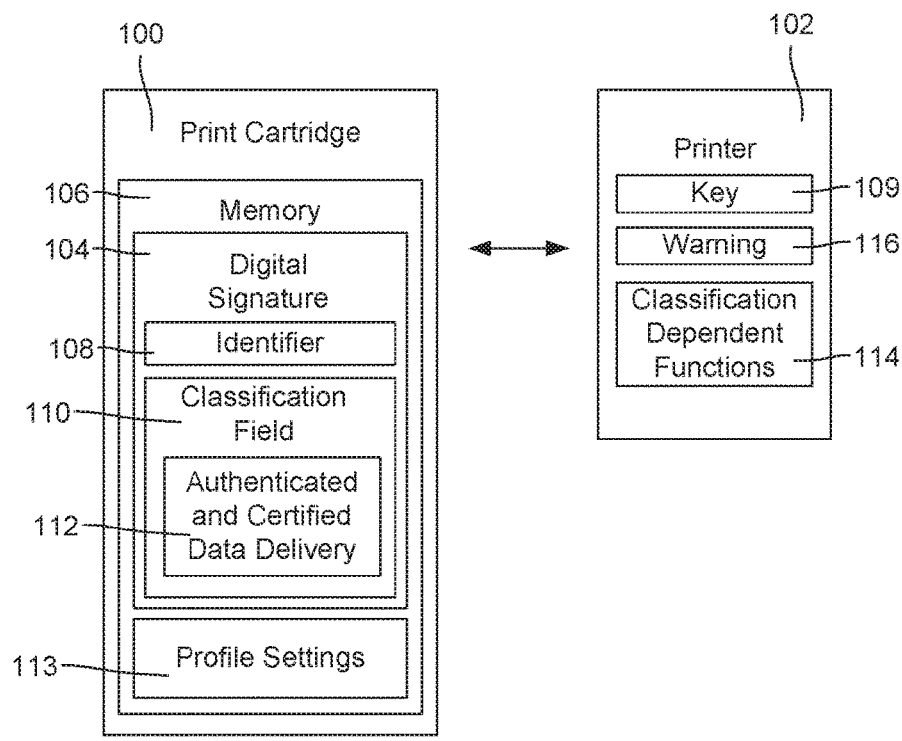
FIG. 1A is a diagram of an example of a consumable product and a device according to the principles described herein.

FIG. 1A is a diagram of an example of a consumable product and a device according to the principles described herein. In this example, the consumable product is a print cartridge (100) and the device is a printer (102). The print cartridge (100) may provide any appropriate supply to the printer including ink, dry toner, wet toner, liquids, other materials, or combinations thereof. While this example is described with reference to the consumable product specifically being a print cartridge, any appropriate consumable product may be used. For example, the consumable product may be an oil filter, an air filter, another type of filter, a print cartridge, a pharmaceutical or forensic fluid container, an erosion prone component of a machine, a battery, another type of component, or combinations thereof. Further, while this example is described with reference to specific types of devices, any appropriate type of device may be used in accordance with the principles described herein. For example, the device (102) may be a two dimensional printer, a three dimensional printer, an automobile, a vehicle, a plane, a boat, construction equipment, machines, a computer, other types of devices, or combinations thereof.

In the example of FIG. 1A, the print cartridge (100) contains a digital signature (104) that is contained in memory (106). The digital signature (104) may contain an identifier (108) that is unique to the print cartridge (100). In other examples, the identifier (108) is contained elsewhere in the print cartridge (100). In both examples, an authentication protocol can be used to authenticate the identifier.

In response to being inserted into the appropriate receptacle in the printer (102), the printer (102) and the print cartridge (100) are positioned to communicate with one another. For example, the printer's receptacle may include electrical contacts that are positioned to abut electrical contacts of the print cartridge (100), which completes an electrically conductive pathway on which the printer (102) and the print cartridge (100) can exchange data. In other examples, the receptacle is positioned such that the print cartridge (100) can wirelessly communicate with the printer (102). In response to being able to communicate, an authentication session between the printer (102) and the print cartridge (100) is initiated where printer (102) executes an authentication protocol to authenticate the digital signature, the identifier, the hardware, other components or code of the printer cartridge (100), or combinations thereof. The print cartridge (100) may request authentication to initiate the authentication session. However, in other examples, the printer (102) initiates the authentication session.

The printer may use a cryptographic key (109), another mechanism, or combinations thereof to interpret the digital signature (104). In some examples, if the digital signature (104) does not appear to be genuine, the printer (102) will deny authentication. However, if the digital signature (104) appears to be genuine, the printer (102) request a classification of the printer cartridge (100) based on a mechanism stored in the print cartridge's memory. For example, the digital signature (104) may include a header or a classification field (110) that identifies the consumable product's classification. The printer (102) bases its decisions for how to interact with the print cartridge (100) based on the print cartridge's classification.

The print cartridge's classification may be an authenticated and certified data delivery classification (112), a third party uncertified data delivery classification, a no data delivery classification, another classification, or combinations thereof. The mechanism may expressly identify the print cartridge's classification. For example, a field in the digital signature (104) may indicate that the classification is the authenticated and certified data delivery classification (110). In other examples, the mechanism may indirectly indicate the classification.

The authenticated and certified data delivery classification (112) may include print cartridges (100) that are made by the same manufacture as the printer (102). In such a situation, the printer (102) may authenticate the print cartridge (102)

and request data that is contained in the print cartridge's memory (106) such as a profile setting (113) for the printer (102). Such data may include parameters and other functional data that can be used to operate the printer (102). For example, the data may include heating parameters, color maps, service parameters, other types of printer functional data, or combination thereof. The data downloaded from the print cartridge (100) may trump over the printer's default settings. In other examples, the data from the print cartridge can be the sole source of functional data.

In some example, the printer (102) has classification dependent functions (114), which are functions or abilities that the printer (102) uses just for authenticated print cartridges (100). For example, the printer (102) may have a unique color map or operational function that involves working with a print cartridge that has a specific format and/or capability. Such a color map or functionality may not perform properly if a print cartridge (100) with a different format or capability was involved. In response to receiving data and/or authenticating the print cartridge (100), the printer may enable such classification dependent functions (114). In other examples, the data delivered from the print cartridge (102) instructs the printer (102) to enable the classification dependent functions.

The third party uncertified data delivery classification may include those print cartridges that are made by a different manufacturer than the manufacturer that made the printer (102), but is nevertheless compatible with the printer (102). In such an example, the printer (102) can still use the data contained in the print cartridge's memory to operate the printer (102). However, the printer (102) may contain a warranty that may be dependent upon the printer (102) being operated with a print cartridge that has been made by the printer's manufacturer. The printer's manufacturer cannot control the data or operation of print cartridge's from other sources, so the printer's manufacturer cannot warranty the performance of the printer when using third party cartridges.

In response to determining that the print cartridge's classification is a third party uncertified data delivery classification, the printer (102) may communicate a warning (116) to the printer's user. The warning (116) may be communicated in an audible format, a written format, a display screen format, an illustrated format, another format, or combinations thereof. The warning (116) may indicate that the third party printer cartridge contains setting data, but that the use of such data may compromise the printer's warranty. The warning (116) may be communicated to the printer's user along with an option to allow for data delivery. If the user selects to allow the third party print cartridge's data to be delivered to the printer, the warranty or at least portions of the warranty on the printer may be compromised or voided. The printer (102) may track the data delivery from the third party print cartridge and/or the authorization from the user to deliver such data that the tracked data is retrievable at a future date for an investigation as to whether the warranty is enforceable. In some examples, a message may be sent over the internet or otherwise sent to the manufacturer notifying the manufacturer or another party that the warranty has been compromised. If the user selects to not allow the delivery of the third party data from the print cartridge (100), the printer (102) may continue to operate based on default printer settings. In such an example, the classification dependant functions (114) may not be operable because the print cartridge is not authenticated. In examples where the printer cannot function with the data from the print cartridge, the printer will not be able to operate the print cartridge if the use selects an option to not use the data stored in the print cartridge.

The no data delivery classification may include print cartridges that are made by third parties, but do not have printer profile settings (113) or other specialized data to operate the printer (102). In such an example, the printer (102) can continue to operate with the printers default settings. In some examples, a warning may be triggered in the printer to notify the printer's user of the third party print cartridge's existence. Even though such a print cartridge does not have data to delivery to the printer (102), the mere use of a third party print cartridge may nevertheless compromise the printer's warranty. Thus, the user can select whether the user desires to use a third party cartridge even though such a print cartridge is compatible with the printer.

Other classifications may also exist. For example, the printer's manufacturer and the print cartridge's distributor may have a contractual agreement that allows at least one of the classification dependent functions (114) to be operable with the third party print cartridge. In such an example, the classification may indicate the print cartridge's distributor, indicate the contract, indicate the classification dependent function, indicate a method to upgrade or enhance printer functionality, indicate other information indicative of the arrangement, or combinations thereof. In some examples, the classification may provide instructions to retrieve data delivery from a source other than the consumable product. For example, consumable products of a particular classification may include a uniform resource locator (URL) for where the host device can retrieve operational data. Other classifications may allow for computer readable updates, other types of arrangements, or combinations thereof.

The classification indicating mechanism allows third parties to develop their own intellectual property for their own print cartridges that may be used by printer users while allowing the printer users to make their own decisions about using the third party cartridges. A printer user can be aware of the arrangement and select those print cartridges that the printer user feels comfortable with using. Despite the printer and the print cartridge coming from different manufacturers, the printer user has the option of combining the technology from both parties. Further, the third party manufacturer is free to continue to compete for the printer user's business by providing a print cartridge for use in their own printers and/or printers of other manufacturers.

In an example, internet connectivity does not have to be established at the time that the print cartridge is installed. In such example, the printer can use the print cartridge with confidence of its authenticity immediately without having to wait to begin the authentication process.

In some examples, the printer begins the authentication session by first attempting to authenticate the hardware of the print cartridge. If authentication of the hardware is successful, the printer continues to authenticate the digital signature stored in the print cartridge. Thus, the authentication of the digital signature is a second layer of protection to determine if the print cartridges are genuine. If both the digital signature and the hardware appear to be genuine, the printer may authenticate the print cartridge or the printer may use an additional layer before authenticating the print cartridge. While this example has been described with reference to specific authentication layers, any appropriate number of layers may be implemented in accordance with the principles described herein. Any appropriate layer to determine authenticity may be implemented in any appropriate order. Further, additional types of layers not described in this specification may also be implemented as other layers, which may be inserted into the authentication process in any appropriate sequence.

While the example above has been described with the identifier and the mechanism for communicating a classification to the host device as being located within the digital signature, in other examples, the identifier and mechanism are stored in the signed data associated with the digital signature. Regardless of whether the identifier and/or mechanism are stored in the signed data associated with the digital signature or are actually located in the digital signature itself, the digital signature indicates that the identifier and/or mechanism are from a trusted source.

Figure 1B:
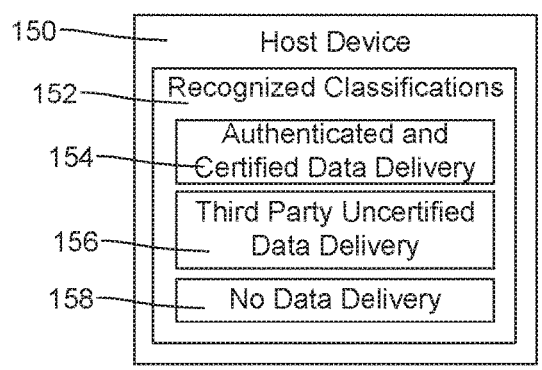
FIG. 1B is a diagram of an example of classifications recognized by a host device according to the principles described herein.

FIG. 1B is a diagram of an example of classifications recognized by a host device (150) according to the principles described herein. In this example, the host device (150) includes recognized classifications (152) in memory that is local to the host device (150) or in memory that is in communication with the host device (150), such memory in a server or a network component.

In this example, the host device (150) recognizes an authenticated and certified data delivery classification (154). In response to determining that the consumable product has this classification, the host device (150) authenticates the consumable product and obtains functional data from the consumable product for operating the host device (150).

Another recognized classification (152) by the host device is a third party uncertified data delivery classification (156). In response to determining that the consumable product has this classification, the host device (150) presents a warning to the user of the host device (150) that the use of the consumable product may compromise the host device's warranty or that obtaining the data stored on the consumable product may compromise the host device's warranty. The user of the host device has an option to continue to use to the third party consumable product and/or to obtain the data stored on the consumable product.

Yet another recognized classification (152) by the host device is a no data delivery classification (158). In response to determining that the consumable product has this classification, the host device (150) may or may not cause a warning to be presented to the host device's user about compromising the host device's warranty. In some examples, the mere use of a third party consumable product compromises the host device's warranty. In such examples, the mere use of the third party consumable product will trigger the warning. In other examples, the mere usage of a third party consumable product does not compromise the host device's warranty alone, but operating the host device according to the information stored in the consumable product compromises the warranty. In such an example, no warning is presented for merely using a third party consumable product that has no data delivery.

In some examples where the host device is a printer, the printer cannot print without valid functional data (certified or uncertified) being present. In such an example, if a print cartridge (the consumable product) does not have data to deliver, the printer will rely on default functional data for operation. However, if the printer does not contain default functional data, the printer will not print.

While the above examples have been described with reference to specific types of recognized classifications, any appropriate type of classification may be used in accordance with the principles described herein. Further, while the above examples have been described with reference to a specific number of recognized classifications, any appropriate number of classifications may be used in accordance with the principles described herein.

Figure 2:
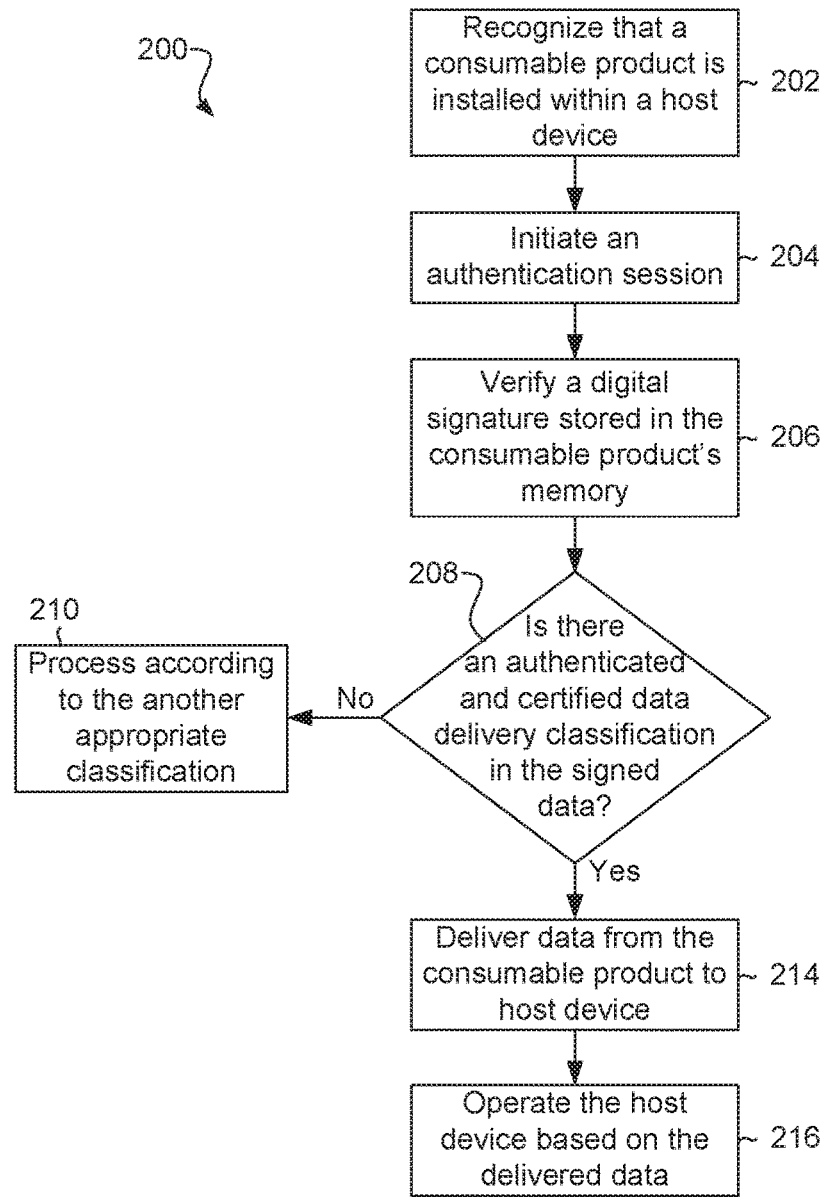
FIG. 2 is a flowchart of an example of a method for communicating a classification of a consumable product according to the principles described herein.

FIG. 2 is a flowchart (200) of an example of a method for protecting data in memory of a consumable product according to the principles described herein. In this example, the method includes recognizing (202) that a consumable product is installed within a host device, initiating (204) an authentication session with the consumable product, and verifying (206) a digital signature stored in the consumable products memory.

The method also includes determining (208) whether there is an authenticated and certified data delivery classification in the digital signature. If there is no authenticated and certified data delivery classification in the digital signature, the method includes processing (210) the host device according to another appropriate classification. If the consumable product fails to retrieve an explicit indication of the consumable product's classification, the method may assign an appropriate classification to the consumable product based on a totality of circumstances.

If the method determines that the authenticated and certified data delivery classification exists, the method may continue by delivering (214) the data from the consumable product to the host device. Further, the host device is operated (216) based on the data delivered from the consumable product.

Figure 3:
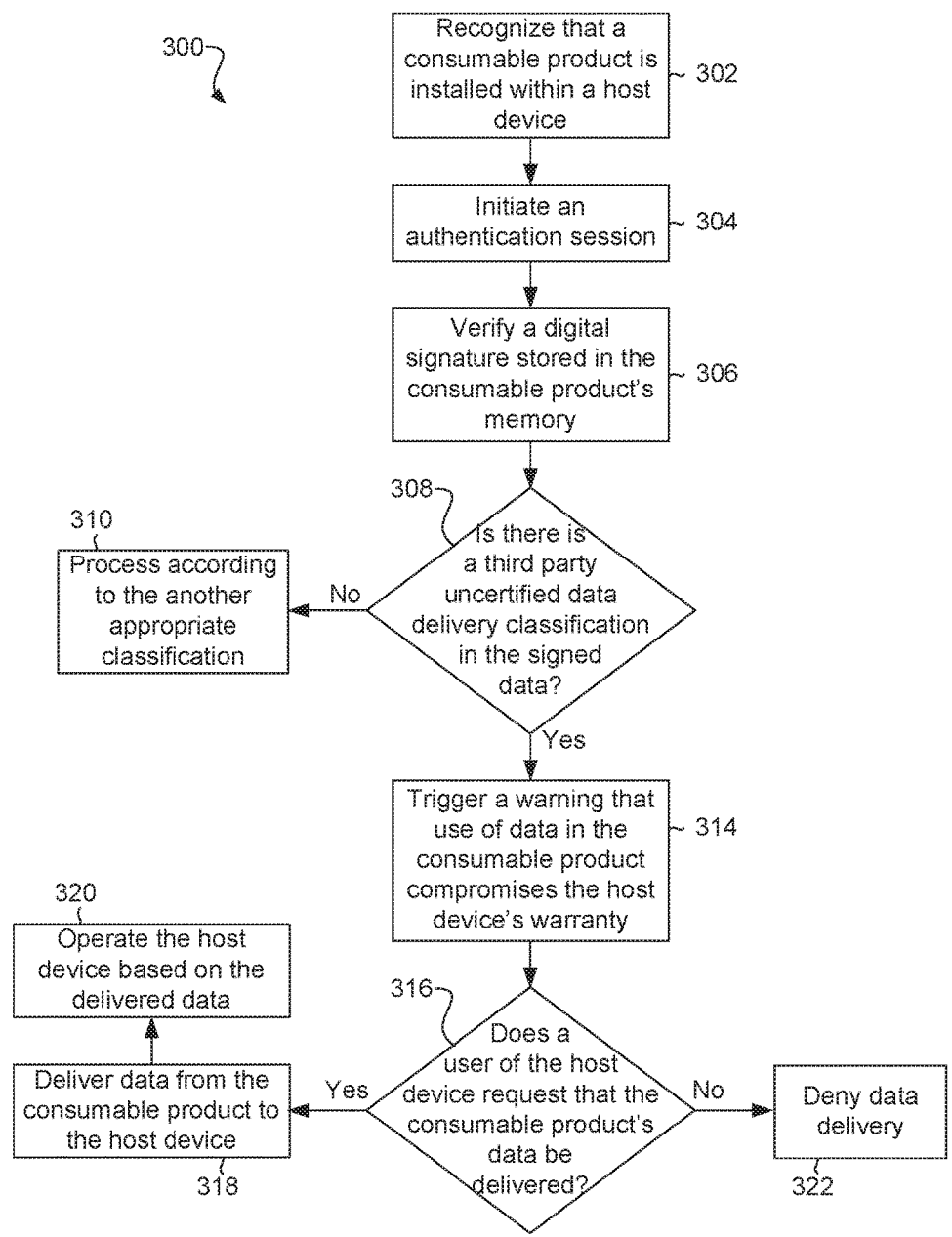
FIG. 3 is a flowchart of an example of a method for communicating a classification of a consumable product according to the principles described herein.

FIG. 3 is a flowchart (300) of an example of a method for protecting data in memory of a consumable product according to the principles described herein. In this example, the method includes recognizing (302) that a consumable product is installed within a host device, initiating (304) an authentication session with the consumable product, and verifying (306) a digital signature stored in the consumable product's memory.

The method also includes determining (308) whether there is a third party uncertified data delivery classification in the digital signature. If there is no third party uncertified data delivery classification in the digital signature, the method includes processing (310) the host device according to another appropriate classification. If the consumable product fails to retrieve an explicit indication of the consumable products classification, the method may assign an appropriate classification to the consumable product based on a totality of circumstances.

If there is a third party uncertified data delivery classification in the digital signature, the method may include triggering (314) a warning that indicates that the use of data in the third party consumable product compromises the host device's warranty. The method also includes determining (316) whether the user of the host device requests that the consumable product's data be delivered. If the host device's user requests that the uncertified data be delivered, the uncertified data (318) is delivered from the consumable product to the host device and the host device is operated (320) based on the delivered data. Such an option will compromise and/or void at least a portion of the warranty as indicated in the warning. On the other hand, if the user selects to not have the uncertified data delivered to the host device, the delivery of the uncertified data will be denied (322). With this option, the host device will be operated based on the default settings of the host device. However, if the consumable product is inoperable with use of the default settings, the host device may not work until the consumable product is removed from the host device.

In other examples, just the mere use of a third party consumable product will void the warranty. Thus, if the user determines to use the third party consumable product while still using just the host device's default settings, at least a portion of the warranty may be compromised.

Figure 4:
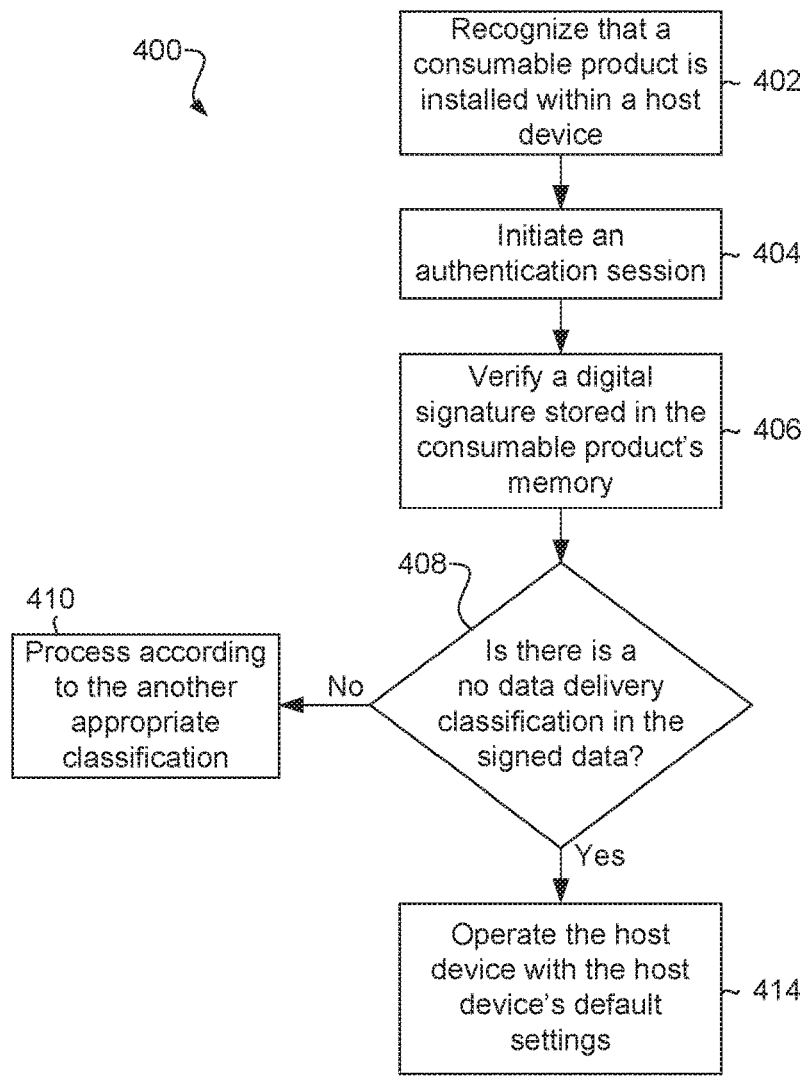
FIG. 4 is a flowchart of an example of a method for communicating a classification of a consumable product according to the principles described herein.

FIG. 4 is a flowchart (400) of an example of a method for protecting data in memory of a consumable product according to the principles described herein. In this example, the method includes recognizing (402) that a consumable product is installed within a host device, initiating (404) an authentication session with the consumable product, and verifying (406) a digital signature stored in the consumable product's memory.

The method also includes determining (408) whether there is a no data delivery classification in the digital signature. If there is a no data delivery classification in the digital signature, the method includes processing (410) the host device according to another appropriate classification. If the consumable product fails to retrieve an explicit indication of the consumable product's classification, the method may assign an appropriate classification to the consumable product based on a totality of circumstances. If there is a no data delivery classification in the digital signature, the method includes operating (414) the host device with the host device's default setting.

In some examples, the no data delivery classification can apply to both third party consumable products as well as consumable products that come from the same manufacturer. In such an example, the consumable product may still be authenticated even if there is no data delivery classification. The authentication may be based on hardware checks, digital signature checks, other layers of authentication, or combinations thereof.

Figure 5:
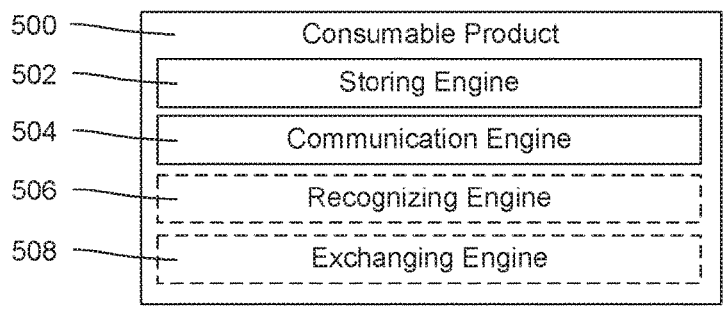
FIG. 5 is a diagram of an example of a consumable product according to the principles described herein.

FIG. 5 is a diagram of an example of a consumable product (500) according to the principles described herein. The consumable product (500) includes a storing engine (502) and a communication engine (504). In this example, the consumable product (500) also includes a recognizing engine (506) and an exchanging engine (508). The engines (502, 504, 506, 508) refer to a combination of hardware and computer readable instructions to perform a designated function. Each of the engines (502, 504, 506, 508) may include a processor and memory. The computer readable instructions are stored in the memory and cause the processor to execute the designated function of the engine.

The storing engine (502) stores an identifier in a memory of the consumable product that is unique to the consumable product. The recognizing engine (506) recognizes that the consumable product is in communication with the host device and that the consumable product should be subjected to an authentication process. The host device may include an authentication engine that initiates the authentication session between the consumable product and the host device. In response to requests from the host device's authentication engine, the consumable product sends the requested information with the exchanging engine (508). For example, the authentication engine may request an identifier in the digital signature.

The communication engine (504) may communicate to the host device a classification of the consumable product. Part of the authentication process may include determining which classification to treat the consumable product. For example, if the consumable product's storing engine (502) stores information that indicates that the consumable product is part of an authenticated and certified data delivery classification, the host device's authentication engine will base authentication in part based on the consumable product's authentication. On the other hand, if the consumable product's storing engine (502) stores information that indicates that the consumable product should be treated as part of the third party uncertified data delivery classification, the host device's authentication engine may deny authentication.

However, denial of authentication does not preclude the use of the consumable product. The user of the host device may receive a message indicating that the consumable product is not authenticated and give the user an option to use the non-authenticated consumable product. The message may also indicate that if the user decides to use the non-authenticated consumable product that at least a portion of the host device's warranty will be compromised and/or voided.

Figure 6:
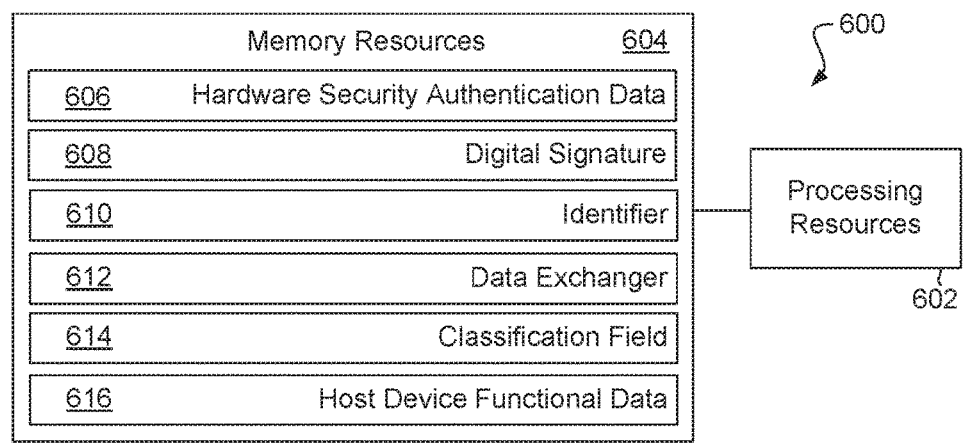
FIG. 6 is a diagram of an example of a communicating system according to the principles described herein.

FIG. 6 is a diagram of an example of a protecting system (600) according to the principles described herein. In this example, the protecting system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the protecting system (600). The programmed instructions shown stored in the memory resources (604) include a data exchanger (612). The data structures shown stored in the memory resources (604) include hardware security authentication data (606), a digital signature (608), an identifier (610), a classification field (614), and host device functional data (616).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The data exchanger (612) represents programmed instructions that, when executed, cause the processing resources (602) to exchange data with a host device during an authentication protocol. For example, the host device may recognize that the consumable product is in a condition to be authenticated if the consumable product is communicating with the host device, the consumable product has sent a request for authentication, the consumable product is secured to the host device, another condition, or combinations thereof. In response to requests from the host device, the data exchanger (612) sends data to the host device.

The requested data may include hardware security authentication data (606) that is intended to be used during a stage of the authentication session where the hardware of the consumable product is being authenticated. The requested data may also include data that is stored in the digital signature (608). For example, the data that may be stored in the digital signature (608) may include the identifier (610), which is unique to the consumable product.

Further, the data exchanger (612) may also request information from a classification field (614) stored in the memory resources (604). In some examples, the classification field (614) is stored in the digital signature (608). In other examples, the classification field is stored elsewhere in the memory resources (604). The classification field (614) may include information that can be used during the authentication session. For example, the consumable product's classification may expressly indicate whether the consumable product should or should not be authenticated. Additionally, the classification field (614) may contain information that indicates whether the host device should use the host device functional data (616) stored in the consumable product's memory resources. For example, a classification, such as no data delivery, indicates that no host device's functional data (616) from the consumable product's memory resources (604) should be used to operate the host device. In other examples, an authenticated and certified data delivery classification indicates that the host device's functional data (616) stored in the consumable product's memory resources (604) should be used to operate the host device.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the computer readable instructions are already installed. Here, the memory resources can include integrated memory such as a hard drive, a solid state hard drive, or the like.

In some examples, the processing resources (602) and the memory resources (604) are located within the same physical component, such as a server or a network component. The memory resources (604) may be part of the physical component's main memory, caches, registers, non-volatile memory, or elsewhere in the physical components memory hierarchy. Alternatively, the memory resources (604) may be in communication with the processing resources (602) over a network. Further, the data structures, such as the libraries and may be accessed from a remote location over a network connection while the programmed instructions are located locally. Thus, the protecting system (600) may be implemented on a user device, on a server, on a collection of servers, or combinations thereof.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A print cartridge memory, comprising:
   hardware security authentication data to provide a first authentication of a print cartridge;
   a digital signature for a print cartridge that provides a second authentication of the print cartridge and indicates that an identifier is from a trusted source;
   the identifier that, when indicated, triggers transmission of a print cartridge classification to a printer;
   a classification field of the digital signature which:
   identifies the print cartridge classification;
   includes information used during authentication of the print cartridge; and
   provides data to deliver, based on the print cartridge classification, an upgrade or added function of the printer.

2. The print cartridge memory of claim 1, wherein the classification is an authenticated and certified data delivery classification indicating the print cartridge is made by a same manufacturer as the printer.

3. The print cartridge memory of claim 1, wherein the classification is a third party uncertified data delivery classification indicating the print cartridge is made by a different manufacturer, but is compatible with the printer.

4. The print cartridge memory of claim 1, wherein the classification indicates a print cartridge distributor.

5. The print cartridge memory of claim 1, wherein the classification field provides instructions to retrieve data delivery form a source other than the print cartridge.

6. The print cartridge memory of claim 5, wherein the classification field indicates a uniform resource locator (URL) where the printer retrieves operational data.

7. The print cartridge memory of claim 1, wherein the hardware security authentication data is distinct from the identifier and classification field.

8. The print cartridge memory of claim 1, wherein the hardware security authentication data and the digital signature are used at different stages of authentication.

9. The print cartridge memory of claim 8, wherein the hardware security authentication data is used during authentication before the digital signature.

10. The print cartridge memory of claim 8, wherein the hardware security authentication data is used during authentication after the digital signature.

11. The print cartridge memory of claim 1, wherein the identifier is part of a digital signature.

12. The print cartridge memory of claim 1, further comprising additional layers of authentication for the print cartridge.

13. The print cartridge memory of claim 1, wherein the classification field triggers, when the classification is a third party uncertified data delivery classification, a prompt to authorize use of a non-authenticated cartridge.

14. A print cartridge memory, comprising:
    hardware security authentication data to provide a first authentication of a print cartridge;
    a digital signature for a print cartridge that provides a second authentication of the print cartridge and indicates that an identifier is from a trusted source;
    the identifier that, when, triggers transmission of a print cartridge classification to a printer;
    a classification field of the digital signature which:
    identifies the print cartridge classification, wherein the print cartridge classification is an authenticated and certified data delivery classification;
    includes information used during authentication of the print cartridge; and
    provides data to deliver, based on the print cartridge classification, an upgrade or added function of the printer.

15. The print cartridge memory of claim 14, wherein the hardware security authentication data is distinct from the identifier and classification field.

16. A print cartridge memory, comprising:
    hardware security authentication data to provide a first authentication of a print cartridge,
    a digital signature for a print cartridge that provides a second authentication of the print cartridge and indicates that an identifier is from a trusted source; and
    the identifier that, when indicated, triggers transmission of a print cartridge classification to a device;
    a classification field of the digital signature which:
    identifies the print cartridge classification, wherein the print cartridge classification is an authenticated and certified data delivery classification;

includes information used during authentication of the print cartridge; and delivers, based on the print cartridge classification, an upgrade or added function of a printer; and profile settings for the printer.

17. The print cartridge memory of claim 16, wherein the hardware security authentication data is distinct from the identifier and classification field.

18. The print cartridge memory of claim 16, wherein the classification field triggers, when the classification is a third party uncertified data delivery classification, a warning and prompt to allow data delivery from the print cartridge memory.

* * * * *

UNITED STATES PATENT AND TRADEMARK OFFICE
CERTIFICATE OF CORRECTION

PATENT NO.        : 10,036,979 B2
APPLICATION NO.   : 15/643054
DATED             : July 31, 2018
INVENTOR(S)       : Paul L. Jeran Page 1 of 1

It is certified that error appears in the above-identified patent and that said Letters Patent is hereby corrected as shown below:

In the Claims

In Column 10, Line 58 (approx.), in Claim 16, delete "cartridge," and insert -- cartridge; --, therefor.

Signed and Sealed this
Fifth Day of February, 2019

Andrei Iancu
*Director of the United States Patent and Trademark Office*